April 1, 1930.  F. R. GRADY  1,753,005
METHOD OF UNITING TUBULAR MEMBERS
Filed Aug. 5, 1926
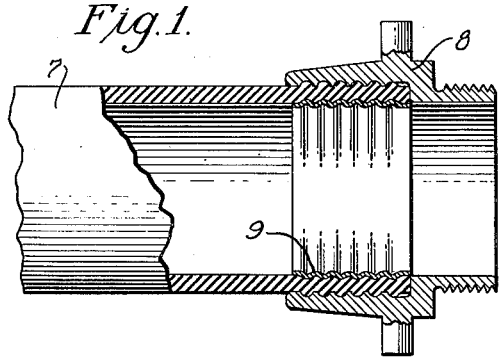
Fig.1.
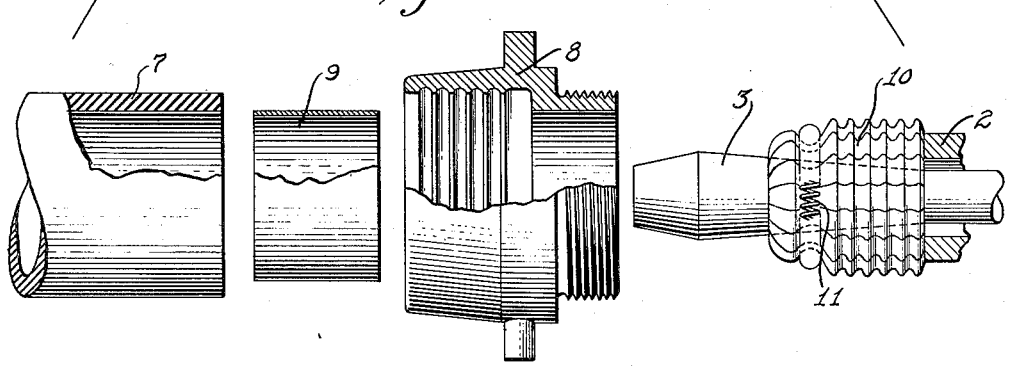
Fig.2.
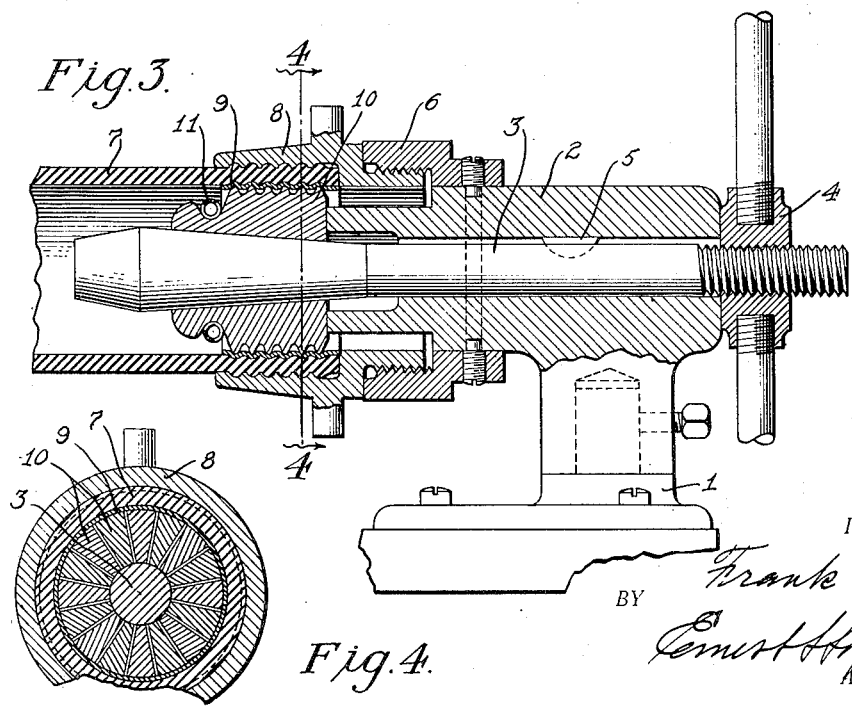
Fig.3.
Fig.4.
INVENTOR.
Frank R Grady
BY
Ernest H. Swinson
ATTORNEY.

Patented Apr. 1, 1930

1,753,005

UNITED STATES PATENT OFFICE

FRANK R. GRADY, OF CALDWELL, NEW JERSEY, ASSIGNOR TO EUREKA FIRE HOSE MANUFACTURING COMPANY, OF JERSEY CITY, NEW JERSEY, A CORPORATION OF NEW JERSEY

METHOD OF UNITING TUBULAR MEMBERS

Application filed August 5, 1926. Serial No. 127,250.

In the manufacture of hose, expanders are used to obtain a strong union between the end of the hose and its coupling. The end of the hose is placed within the coupling socket and slipped over a tightly fitting metal ring. This metal ring is then expanded thereby binding the hose end between the expanded ring and the coupling socket. The expansion means ordinarily used for expanding the interior ring consists of a hollow smooth surfaced cylindrical member composed of wedge shaped segments, each of which is free to move outwardly in a direction normal to the common axis. The expansion ring is slipped over the assembled segments which are then spread outwardly by forcing a core of increasing diameter through the hollow center of the cylinder formed by the assembled segments. Heretofore, expansion segments have been smooth surfaced, spreading the expansion ring without crimping its surface. It has been found in many instances that the union thus formed has not been strong enough to withstand the high water pressures to which such hose couplings are submitted.

It is the object of this invention to provide an improved method for effecting union between a hose, a coupling, and an expansion ring.

A feature of the invention is the method of expanding a ring and corrugating the same.

An expander equipped with a type of segment having a corrugated surface as disclosed herein not only expands the interior ring but also crimps it, causing the ring to conform to its own surface. If the adjoining face of the coupling socket is grooved, crimping or corrugating of the expansion ring will cause the hosing to flow into these grooves thereby binding the hose end between the coupling socket and the ring.

The invention will best be understood if the following description is read in connection with the accompanying drawings in which, Fig. 1 is a front view partially in section showing the complete assembly of the hose coupling, hose and interior expansion ring;

Fig. 2 is a partially sectional view showing:

(a) A section of hosing.

(b) An expansion ring partially cut away.

(c) A coupling member partially cut away showing the manner in which the hosing engages the grooved inner surface of the coupling socket after the crimping of the expansion ring.

(d) The expansion segments operatively mounted upon a mandrel, one end of the segments abutting the sleeve through which the mandrel slides.

Fig. 3 is a longitudinal view in cross-section of the complete expander and the coupling assembly showing the relative position of the members at the completion of the operation of crimping the inner ring; and Fig. 4 is a transverse sectional view of Fig. 3 along the line 4—4 of Fig. 3.

Referring first to Fig. 3, there is shown an expander comprising a frame or standard 1 supporting a sleeve 2, having interiorly a circular slide in which a mandrel 3 is keyed. The mandrel, which is considerably longer than the sleeve, is threaded at its rear end and engages the hand nut 4 secured at the end of the sleeve. By actuating the hand nut for which handles are provided, the mandrel may be moved longitudinally into or out of the sleeve. For purposes of illustration, the mandrel 3 is shown keyed to the sleeve by the key 5 running in a groove in the sleeve, but any other suitable guide means may be used as desired. The front portion of the mandrel is tapered, having its greatest diameter at a point near its front end and growing gradually smaller toward its middle portion. Before commencing the operation of expanding the ring inside of the hose, the mandrel is moved out of the sleeve until the front portion of the mandrel is extended beyond the end of the sleeve. The corrugated expansion segments 10 are placed around the mandrel between the front tapered portion and the end of the sleeve. For convenience in handling, these segments may be loosely bound together by means of a band or spring 11. The tight fitting expansion ring 9 is drawn over the end of the mandrel and placed over the expansion segments 10. It will be readily seen that when the hand nut 4 is actuated, moving the mandrel inwardly, the expansion segments 10 which are held in position against the end of the sleeve, will be forced apart as the diameter of the mandrel increases, thereby expanding the ring and causing it to conform to the corrugated surface of the segments. After the expansion ring has been placed over the segments surrounding the mandrel, a hose end, having exteriorly a coupling member to which it is to be joined, is placed over the end of the mandrel and over the expansion ring having interiorly expansion segments 10. The coupling member 8 may be secured to the sleeve 2 in any desired manner such, for example, as by providing a coupling member 6 with which it may be threadedly engaged. Since the hose end is now contained between the exterior grooved coupling socket and the interior expansion ring, as mandrel 3 is drawn inwardly, the corrugated segments 10 will be spread causing the crimping of the expansion ring 9 thereby forcing the hosing into the grooves contained upon the interior surface of the socket of the coupling 8.

It will be readily understood that the union formed in the manner disclosed above is exceptionally strong and adapted to meet very high pressures.

Having thus described my invention, what I claim and desire to protect by Letters Patent is:

1. The method of uniting tubular members which comprises disposing a portion of one tubular member between a metal ring and a second tubular member having annular recesses, forcing the metal ring laterally against the first mentioned tubular member by pressure applied at spaced intervals whereby the ring becomes corrugated and forces the first mentioned tubular member against the recessed portion of the second tubular member.

2. The method of uniting tubular members which comprises disposing a portion of one tubular member between a metal ring and a second tubular member having annular recesses, forcing the metal ring laterally against the first mentioned tubular member by pressure applied opposite the annular recesses whereby the ring becomes corrugated with the ridged portions forcing the first mentioned tubular member against the recesses of the second mentioned tubular member.

3. The method of uniting tubular members which comprises disposing a portion of one tubular member within a second tubular member having annular recesses in its inner surface, disposing an expansible ring within the second tubular member and forcing the metal ring outwardly against the first mentioned tubular member by pressure applied opposite the annular recesses whereby the ring becomes annularly corrugated with the ridged portions forcing the first mentioned tubular member into the recesses of the second mentioned tubular member.

Signed at Jersey City, county of Hudson, State of New Jersey, this 31st day of July, 1926.

FRANK R. GRADY.